US010010088B2

(12) United States Patent
Trembley et al.

(10) Patent No.: US 10,010,088 B2
(45) Date of Patent: Jul. 3, 2018

(54) RAPID CHILL PROCESS FOR POULTRY CARCASSES

(71) Applicant: AIR PRODUCTS AND CHEMICALS, INC., Allentown, PA (US)

(72) Inventors: Jean-Philippe Trembley, Surrey (GB); Paul Mark Ames, Hampshire (GB)

(73) Assignee: Air Products and Chemicals, Inc., Allentown, PA (US)

( * ) Notice: Subject to any disclaimer, the term of this patent is extended or adjusted under 35 U.S.C. 154(b) by 21 days.

(21) Appl. No.: 14/873,784

(22) Filed: Oct. 2, 2015

(65) Prior Publication Data
US 2016/0106114 A1 Apr. 21, 2016

(30) Foreign Application Priority Data
Oct. 15, 2014 (EP) .................................. 14189069

(51) Int. Cl.
| | |
|---|---|
| A23B 4/06 | (2006.01) |
| F25D 3/11 | (2006.01) |
| A22C 21/00 | (2006.01) |
| A23B 4/16 | (2006.01) |
| A22B 5/00 | (2006.01) |

(52) U.S. Cl.
CPC ............ *A23B 4/062* (2013.01); *A22B 5/0076* (2013.01); *A22C 21/00* (2013.01); *A23B 4/06* (2013.01); *A23B 4/16* (2013.01); *F25D 3/11* (2013.01); *A23V 2002/00* (2013.01)

(58) Field of Classification Search
CPC ......... A22B 5/0076; A23B 4/062; A23B 4/16; A23B 4/06; A22C 21/00; F25D 3/11; A23V 2002/00
See application file for complete search history.

(56) References Cited

U.S. PATENT DOCUMENTS

| | | | |
|---|---|---|---|
| 3,637,405 A | 1/1972 | Mendelson et al. | |
| 4,367,630 A | 1/1983 | Bernard et al. | |
| 5,220,812 A * | 6/1993 | Palbiski | A23B 7/0433 62/381 |
| 5,694,776 A * | 12/1997 | Sahm | F25D 16/00 62/332 |
| 6,167,709 B1 | 1/2001 | Caracciolo, Jr. et al. | |
| 9,314,049 B2 * | 4/2016 | Nicholson | A23L 3/361 |
| 2005/0153032 A1 | 7/2005 | Hilgren et al. | |

(Continued)

FOREIGN PATENT DOCUMENTS

| | | | | |
|---|---|---|---|---|
| CA | 2848213 A1 * | 3/2013 | ......... | A22C 21/0061 |
| EP | 3009002 A1 * | 4/2016 | .......... | A22B 5/0076 |

(Continued)

*Primary Examiner* — Steven Leff
(74) *Attorney, Agent, or Firm* — Larry S. Zelson

(57) ABSTRACT

Poultry carcasses are chilled rapidly when exposed to a flow of gaseous air at a temperature in the range from about −50° C. to about −120° C. for a period of time in the range from about 1 s to about 60 s. The flow is directed over and into the body cavity of the carcasses. The carcasses are orientated in the flow such that the sternum of each carcass faces downstream. One advantage of the process is that the number of viable microorganisms present on the carcasses is reduced significantly while avoiding freeze-damage to the carcasses.

17 Claims, 4 Drawing Sheets

(56) References Cited

U.S. PATENT DOCUMENTS

| | | | | |
|---|---|---|---|---|
| 2005/0159324 A1* | 7/2005 | Man | ................ | A23B 4/20 |
| | | | | 510/218 |
| 2010/0317272 A1* | 12/2010 | Hazenbroek | ....... | A22C 21/0023 |
| | | | | 452/125 |
| 2013/0231034 A1* | 9/2013 | O'Neil | ............... | A22C 17/08 |
| | | | | 452/173 |
| 2015/0157050 A1* | 6/2015 | Nicholson | .......... | A22C 21/0061 |
| | | | | 452/177 |
| 2015/0313247 A1* | 11/2015 | Nicholson | .............. | A23B 4/062 |
| | | | | 452/177 |
| 2016/0106114 A1* | 4/2016 | Trembley | ............. | A22B 5/0076 |
| | | | | 426/524 |

FOREIGN PATENT DOCUMENTS

| | | |
|---|---|---|
| GB | 105570 A | 7/1917 |
| NL | 9301244 A | 2/1995 |
| WO | 2004080189 A1 | 9/2004 |
| WO | 2012168685 A1 | 12/2012 |

\* cited by examiner

RAPID CHILL PROCESS FOR POULTRY CARCASSES

The present invention relates to a process and apparatus for rapidly chilling poultry carcasses in general, and to a rapid chill process for reducing the number of viable microorganisms on the poultry carcasses in particular.

Bacteria, such as the *Campylobacter* and *Salmonella* species, represent a significant food hygiene and health issue. It is estimated that the *Salmonella* species is responsible for between 2 to 4 million cases of food poisoning each year in the US alone. It is also estimated that the *Campylobacter* species is responsible for even more cases than are caused by *Salmonella* bacteria. The total number of *Campylobacter* cases across the European Union states is calculated at 9 million cases each year.

Poultry flocks are often infected naturally with *Campylobacter* bacteria. The poultry industry has been researching ways of eradicating *Campylobacter* bacteria from the flocks before they arrive at the factory for processing. The results of this research are mixed and, thus, contamination of the birds has not been eradicated nor reliably reduced. Inoculations and hygiene protocols have successfully eradicated infection by *Salmonella* bacteria in battery flocks.

It would obviously be preferable to eradicate all unwanted bacterial infection from livestock. However, whilst research into suitable eradication methods continues, there is a need for a reliable method of disinfecting meat, in particular poultry meat, during processing of the meat. A suitable method would be non-intrusive and would leave the meat in a form that is as natural as possible, e.g. the method must not leave any chemical trace or by-products on the carcass and must not spoil the appearance of the meat.

One existing method of disinfecting poultry carcasses involves washing the carcasses with water containing disinfectant(s). However, in Europe, regulations require that potable water must be used to wash poultry carcasses and, thus, disinfectants cannot be present. The prohibition on the use of dissolved disinfectants not only prevents decontamination of carcasses but also prevents continual disinfection of processing equipment and, thus, bacterial transfer and cross-contamination between individual carcasses remains a significant problem in Europe.

One example of a process inhibiting bacterial growth on poultry meat during processing is disclosed in GB2105570A (Ralph; published on 30 Mar. 1983). In this process, eviscerated poultry carcasses are washed to remove contaminants such as intestinal and faecal matter and the washed carcasses "moisturised" in a bath of unrefrigerated water that pre-chills the carcasses. Surface water is removed from the pre-chilled carcasses which are then exposed to a supercold atmosphere at an effective freezing temperature of about −123° C. produced using streams of cold carbon dioxide gas containing solid carbon dioxide particles. In this way, the surface of each carcass is crust frozen. The carcasses are then allowed to temper by exposure to a temperature between 3.3° C. to 0° C. The primary purpose of the crust-freeze step is to prevent water loss and weepage from the carcasses thereby maintaining the desirable qualities of the meat. However, it is disclosed that any bacterial growth is greatly inhibited thereby improving the shelf life of the product. There is no disclosure of the process having any bactericidal effect.

U.S. Pat. No. 3,637,405A (Mendelson et al; published on 25 Jan. 1972) discloses a process for packaging and preserving meat. In the exemplified embodiment, a line of packaged cut-up or whole chicken is exposed to blasts of cold air at a temperature of −40° C. for about 60 mins. The resultant packages of crust-frozen chicken meat are then placed in cold storage at about 0° C. for at least 3 h. It is disclosed that the bacteria growth rate is inhibited but there is no disclosure of the process being bactericidal.

Further crust freezing processes for inhibiting bacterial growth on meat are disclosed in U.S. Pat. No. 4,367,630A (Bernard et al; published on 11 Jan. 1983), NL9301244A (published on 1 Feb. 1995) and WO2004/080189A (Jones et al; published 24 Sep. 2004).

WO2004/080189A discloses rapidly cooling meat by exposure to a rapid cooling temperature of no more than about −10° C. for sufficient time to form a frozen crust on the meat, and chilling the crust frozen meat by exposure to a chilling temperature greater than the rapid cooling temperature by no more than about +10° C. to raise the temperature of the surface of the meat and to maintain the surface at a temperature no higher than about the freezing temperature of the meat for at least sufficient time to injure lethally and/or kill bacteria. The technical effect of the process is stated to be reducing the viability of bacteria on meat, particularly gram negative bacteria such as *Campylobacter* and/or *Salmonella* bacteria. The process has particular application in the processing of poultry meat on the carcass of a dressed freshly slaughtered unboned poultry bird, especially chickens and turkeys.

WO2012/168685A (Hall et al; published 13 Dec. 2012) discloses a process for reducing the number of viable microorganisms on the surface of poultry carcasses. The process involves exposing the surface membrane of the carcasses to a temperature $T^2$ in the range of −20° C. to −120° C., preferably −50° C. to −80° C., for a period of time in the range from 10 s to 10 mins, preferably from 1 min to 4 mins. It is disclosed that refrigerated air may be used to cool the carcasses but that, preferably, the surface membrane of the carcasses is exposed to a spray of liquid nitrogen as exemplified.

It is an objective of preferred embodiments of the present invention to provide an improved process for rapidly chilling poultry carcasses that kills bacteria without freezing the meat on the carcasses.

According to a first aspect of the present invention, there is provided a process for rapidly chilling poultry carcasses to reduce the number of viable microorganisms present thereon, said process comprising exposing poultry carcasses to a flow of gaseous air at a temperature in the range from about −50° C. to about −120° C. for a period of time in the range from about 1 s to about 60 s, wherein said flow is directed over said carcasses and into the body cavity of said carcasses, and said carcasses are orientated in said flow such that each sternum faces downstream.

The Inventors have discovered that the use of gaseous air as a refrigerant, rather than a spray of liquid nitrogen, is advantageous in a rapid chill process for poultry carcasses because an effective bactericidal effect may be achieved reliably without damaging the meat, particularly if the temperature and exposure time are carefully controlled to be within the ranges identified above, and if the carcasses are positioned and orientated in the particular way identified above relative to the flow of gaseous air.

Gaseous air at a temperature in the range from about −50° C. to about −120° C. may be referred to as "super-chilled" air. The Inventors have discovered that, in general, damage caused by exposure of the skin to super-chilled air depends on the orientation of the carcasses relative to the flow of air and that, specifically, the damage is reduced, minimised or even eliminated if the carcasses are orientated as indicated above.

As far as the Inventors are aware, the art is completely silent on the importance of the orientation of the carcasses relative to the flow of refrigerant.

Without wishing to be bound by any particular theory, the inventors believe that the reduction in the viability of microorganisms on poultry carcasses using the present invention is due to disruption of the integrity of membranes of the microorganisms. It is proposed that such disruption may be caused by exposure to the super-chilled air itself, e.g. the membrane is damaged or destroyed by the sudden drop in temperature. After exposure to the super-chilled air, the carcasses are typically allowed to recover by natural warming, i.e. without using an heater, through the remainder of the production process. Such recovery is thought to contribute to the optimisation of the bactericidal effect of the rapid chill process.

In conventional chill processes, poultry carcasses are usually chilled to the required extent by exposure to chill temperatures from about +5° C. to about −20° C. using mechanical refrigeration. The time taken to chill conventionally the poultry carcasses is usually measured in hours. In contrast, "rapid chill" processes expose the carcasses to cryogenic temperatures, e.g. from about −80° C. to about −120° C., so that the time taken to reach the required level of chill is significantly less, e.g. no more than a few minutes.

The term "air" is intended to refer to gas mixtures having compositions that are at least similar to atmospheric air. The gas mixtures typically comprise from about 76 mol. % to about 80 mol. %, e.g. about 78 mol. %, nitrogen and about 19 mol. % to about 23 mol. %, e.g. about 21 mol. %, oxygen. Such gas mixtures avoid the need for special safety equipment to prevent asphyxiation. The gas mixtures usually also comprise about 1 mol. % argon and possibly trace amounts of one or more of gases selected from the group consisting of carbon dioxide, neon, helium, methane, krypton, xenon and hydrogen. In preferred embodiments, the gaseous air is natural atmospheric air.

The gaseous air is the only refrigerant used in the process according to the first aspect of the present invention that contacts directly (and hence chills) the poultry carcasses. The air does not contain any cryogenic liquid, such as liquid nitrogen or liquid carbon dioxide, for example in the form of a spray and, thus, there are no particles of cryogenic liquid entrained in the flow of air. The air also does not contain any solid cryogen, such as particles of solid carbon dioxide or carbon dioxide "snow".

The temperature of the gaseous air is usually achieved by indirect heat exchange with a liquid cryogen, such as liquid nitrogen or liquid carbon dioxide. The gaseous air is not cooled by direct heat exchange with a spray of liquid cryogen.

The temperature of the gaseous air will depend on the size and weight of the birds, process speed, and whether or not the birds are pre-chilled, but is usually lower than −75° C., preferably lower than −80° C., and more preferably lower than about −90° C. The temperature is usually no lower than about −110° C., and preferably no lower than about −105° C. In preferred embodiments, the temperature of the gaseous air is in the range from about −95° C. to about −105° C., e.g. about −100° C.

The flow rate of the gaseous air will be determined to suit process requirements and will take into account factors such as bird size/weight, production speed, pre-chilling etc. However, the flow rate may typically be from about 1500 m³/h to about 2500 m³/h, e.g. about 2000 m³/h.

Moisture will be picked up into the air from the poultry carcasses. However, since the temperature of the gaseous air is at least as low as −50° C., and usually lower than this figure, the gaseous air is usually dehumidified as moisture will freeze out of the air.

The invention has particular application in the processing of "dressed" poultry carcasses, i.e. slaughtered, defeathered, eviscerated whole poultry birds with the head and feet removed. Each carcass has a body with an exterior surface, and a body cavity defined by an interior surface that is accessed from an entrance at the rear end of the body. The sternum (or "keel" or "keel bone") is located in the middle of the breast of the carcass.

The term "poultry" is used herein to include any domestic fowl, e.g. chickens, hens, ducks, geese and turkeys, or game or wild fowl, e.g. ducks, geese, grouse, guinea fowl, pigeons, partridges, pheasants, swans and quails. However, the invention has particular application to factory farmed poultry, particularly chickens and turkeys.

In embodiments involving chicken carcasses, the carcasses typically have a mass (or "evisceration weight" or "EV weight") in the range from about 1 kg to about 2.6 kg and may be sub-divided into "light" carcasses (typically, from about 1 kg to about 1.2 kg), "medium" carcasses (typically, from about 1.5 kg to about 1.6 kg) and "heavy" carcasses (typically, from about 2.5 kg to about 2.6 kg).

The "number" of microorganisms refers to the total number of microorganisms in all colonies found on the exterior and interior surfaces of the carcasses. The number may be measured in terms of colony forming units per gram ("cfu/g") of the poultry carcass. The reduction in the number of microorganisms (cfu/g) is statistically significant and reductions by at least 1 $\log_{10}$ unit are typical. Indeed, the reduction is usually at least 1.5 $\log_{10}$ units, preferably at least 2 $\log_{10}$ units, more preferably at least 2.5 $\log_{10}$ units and most preferably by at least 3 $\log_{10}$ units. In terms of percentage of microorganisms killed, the process typically kills more than 90%, usually at least 95%, preferably at least 98%, more preferably at least 99% and most preferably at least 99.9%, of the microorganisms.

The term "microorganism" refers to any pathogen that is capable of causing disease in humans or other animals. The microorganisms are usually bacteria, especially gram negative bacteria such as *Campylobacter* and *Salmonella* species. The process has particular application in reducing the numbers of viable *Campylobacter* bacteria, particularly *Campylobacter jejuni* or *Campylobacter coli*. *Campylobacter* is often found in the caecum of poultry birds and transfer to the skin is thought to occur when the birds are slaughtered and eviscerated.

The process may be a batch process but is typically a continuous process. Indeed, the process is intended to form a part of a larger in-line process for slaughtering poultry and preparing the carcasses for sale to consumers. For example, such commercial processes can process from 6000 to 12000 birds/h, or more.

In these preferred embodiments, the poultry carcasses are usually conveyed on a continuous shackle line through the flow of the gaseous air. The carcasses are usually hung upside-down from shackles by the legs and the flow of air is angled downwards from behind the carcasses, not only over the exterior surface of carcasses, but also into the body cavity of each carcass through the entrance at the rear end. With the sternum of each carcass facing downstream, "freeze-damage" caused by the super-chilled air is typically reduced and preferably minimised and even eliminated.

In a particularly preferred embodiment, the poultry carcasses are conveyed on the continuous shackle line through a first flow of gaseous air, and then through a second flow of gaseous air. The first and second flows of gaseous air can be provided from separate ducts although, in preferred embodiments, the first and second flows of gaseous air are provided from at least one common duct between first and second lengths of the same shackle line.

In another preferred embodiment, a first plurality of the poultry carcasses is conveyed on a first continuous shackle line through a first flow of the gaseous air, and a second plurality of the poultry carcasses is conveyed simultaneously and in parallel on a second continuous shackle line through a second flow of the gaseous air. The first and second flows of gaseous air can be provided from separate ducts although, in preferred embodiments, the first and second flows of gaseous air are provided from at least one common duct located between the parallel shackle lines.

The flow of gaseous air is advantageously in the form of a planar sheet to provide an even flow over the carcasses. The flow is provided from one or more nozzles having any suitable shape of aperture, e.g. circular, elliptical, polygonal, square or rectangular. For example, the flow may be provided from a row of nozzles having circular apertures. However, in preferred embodiments, the flow is provided from one or more elongate nozzles (or "slits") having rectangular apertures.

The poultry carcasses should be sufficiently close to the nozzles to ensure that the flow of air passes over the exterior surface of the carcasses and into the body cavity but not so close to cause freeze-damage (or wind chill). The Inventors have discovered that the optimum distance for the poultry carcasses from the nozzles is typically in the range from about 80 mm to about 100 mm, e.g. about 100 mm. Carcasses moving on continuous shackle lines may swing to and fro, particularly where the lines are serpentine in configuration. In such circumstances, the distance is an average distance.

The angle at which the flow of super-chilled air impinges on the carcasses depends on several different factors including the distance the carcasses hang from the nozzles and the height of the carcasses relative to the nozzles. In preferred embodiments, however, the angle is preferably from about 40° to about 50°, e.g. about 45°, since these angles appear to be optimum to achieve an even flow over the carcasses and into the body cavities.

The period of time that the poultry carcasses are exposed to the flow of gaseous air will depend on the size and weight of the birds, process speed, and whether or not the birds are pre-chilled, but is usually at least 15 s, and preferably at least 25 s. The period of time is usually no more than about 55 s, and preferably no more than about 50 s. In preferred embodiments, the period of time is in the range from about 30 s to about 45 s.

The Inventors have discovered that these exposure times are not only important from the point of view of preventing damage from overexposure to the super-chilled air, but also from the point of view of preventing damage when birds are trussed later in the process. Trussing birds ensures that the legs and wings are firmly fastened against the body, which helps the bird maintain its shape and cook evenly without drying out any of the extremities.

After the exposure to gaseous air, the carcasses are typically allowed to equilibrate for a period of time of at least 5 mins before further processing, e.g. trussing. The total equilibration time depends on the size and weight of the birds but is usually no more than 30 mins. However, in embodiments where the process is retro-fitted to an existing chill line, the equilibration time may depend on the ability to integrate the rapid chilling step into an existing processing line so this time may be as long as 100 mins.

The carcasses are usually pre-chilled to an initial temperature in the range from about +7° C. to about −1° C., e.g. about +4° C., prior to exposure to the flow of gaseous air. This temperature is usually an average temperature throughout the body of the meat. If the carcasses are not pre-chilled, then the exposure time and/or temperature of the gaseous air would be adjusted within the claimed ranges to compensate.

The complete processing time from slaughter to product ready for transport may be from 2 h to 4 h. The time from the birds being unloaded to the start of the chill process is typically 10 to 20 mins. Total chill times (which include the rapid chill time discussed herein) may be from about 90 mins to 3 h depending on the size and weight of the birds. Packing usually adds a further 20 to 30 mins after chill.

According to a further arrangement of the first aspect of the present invention, there is provided a process for reducing the number of viable microorganisms present on the surface of on poultry carcasses, said process comprising exposing poultry carcasses to a flow of gaseous air at a temperature in the range from about −80° C. to about −120° C. for a period of time in the range from about 20 s to about 55 s. The flow is preferably directed not only over the carcasses, but also into the body cavity of the carcasses, and the carcasses are typically orientated in the flow such that the sternum of each carcass faces downstream.

According to a second aspect of the present invention, there is provided use of a process according to the first aspect to reduce the number of viable microorganisms on the surface of poultry carcasses.

According to a third aspect of the present invention, there is provided apparatus for rapidly chilling poultry carcasses to reduce the number of viable microorganisms thereon, said apparatus comprising:
- an insulated chill chamber having an entry port and an exit port;
- a continuous shackle line located within said chill chamber for conveying poultry carcasses from said entry port to said exit port;
- a heat exchanger for cooling air by indirect heat exchange against a liquid cryogen;
- at least one nozzle located parallel to said continuous shackle line for feeding a flow of cooled air into said chill chamber in the form of a planar sheet, said nozzle(s) being arranged to direct said flow over said carcasses and into the body cavity of said carcasses on said shackle line;
- a first duct for feeding cooled air from said heat exchanger to said nozzle(s);
- a second duct for feeding warmed air from said chill chamber to said heat exchanger; and
- a fan for circulating air around the apparatus.

The entry port and exit port may be different ports, or the apparatus may have a single aperture that is sufficiently large that part of it functions as the entry port and another part of it functions as the exit port.

In some preferred embodiments, there is more than one continuous shackle line, for example twin shackle lines in parallel. In such embodiments, there is usually at least one elongate nozzle for each shackle line. In addition, first duct may be common to each elongate nozzles although other embodiments in which more than one duct are contemplated.

Examples of the present invention will now be described with reference to the figures in which.

Figure 3:
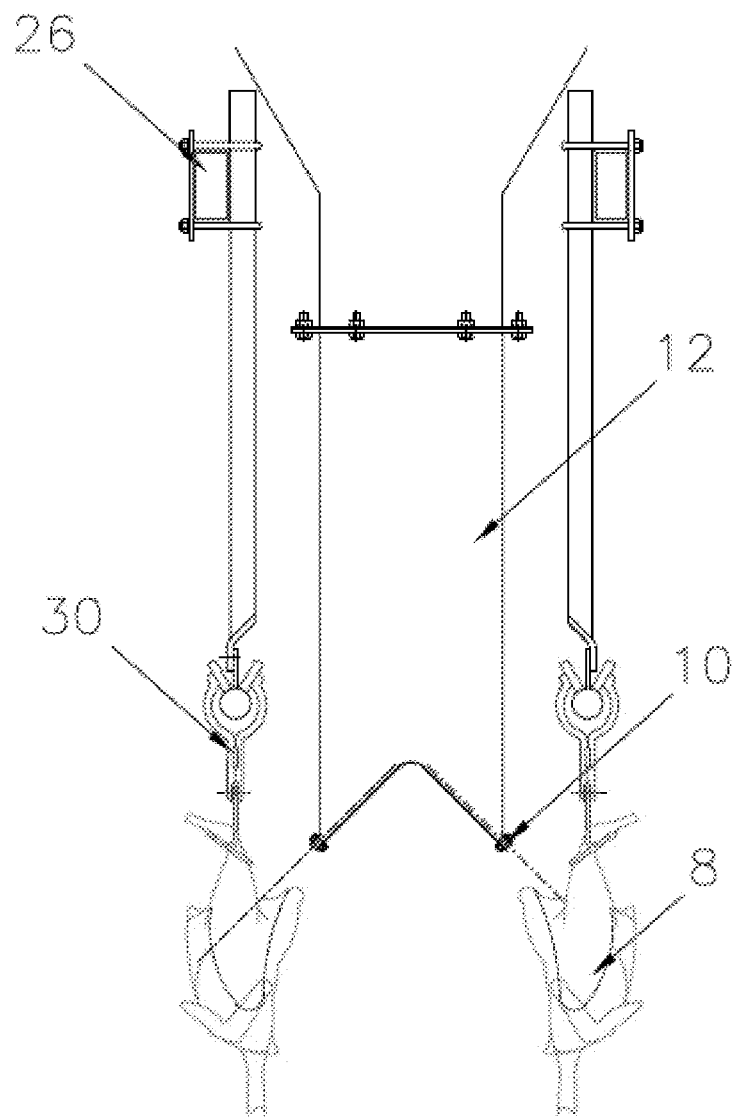
Figure 4:
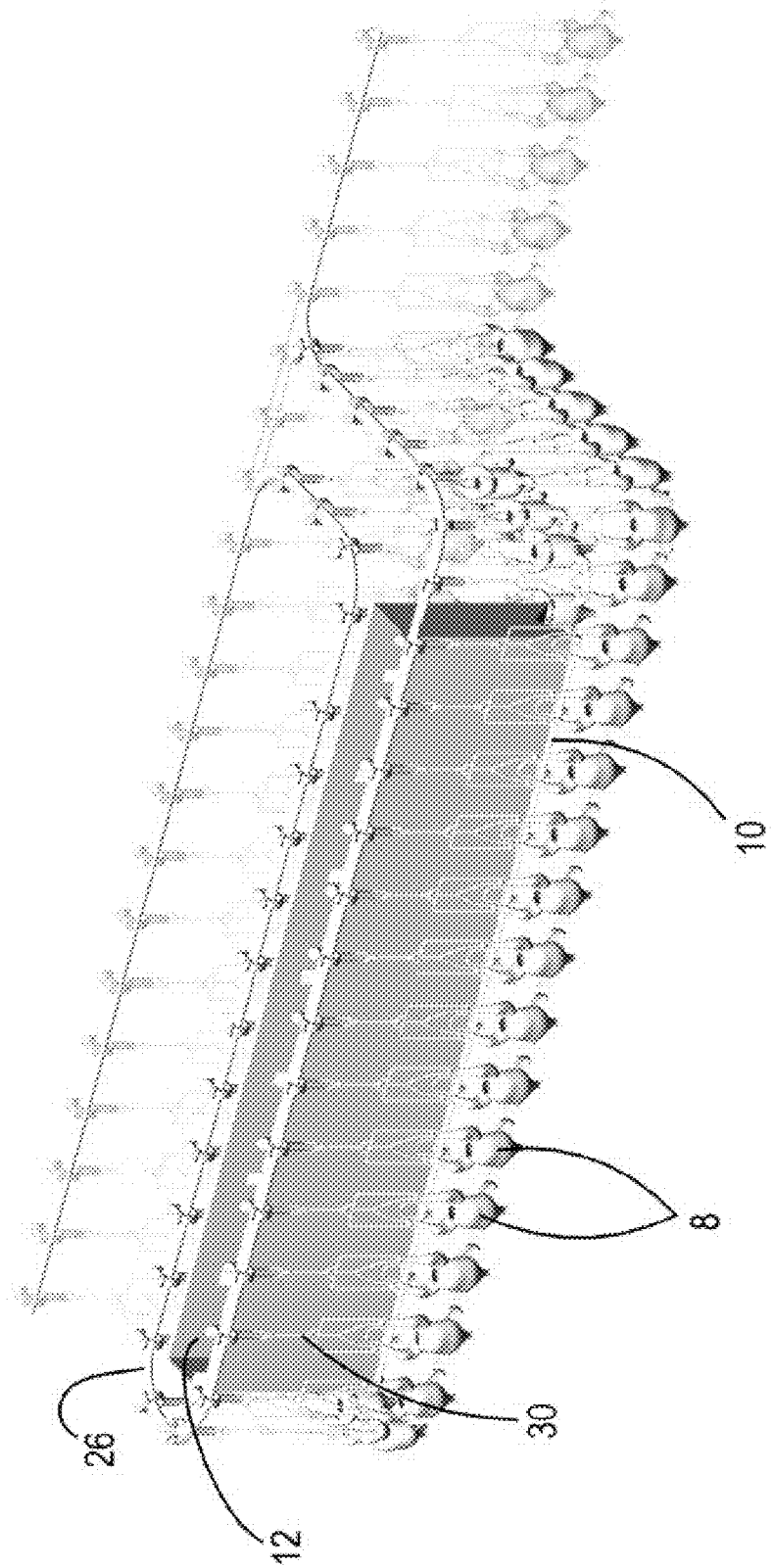

FIG. 3 is a partial cross-sectional view of another embodiment of apparatus according to the present invention involving at least one continuous shackle line and a duct providing twin flows of super-chilled gaseous air; and FIG. 4 is a schematic representation in part of a further embodiment of apparatus according to the present invention involving a section of continuous shackle line passing through a rapid chiller retro-fitted to an existing continuous shackle line from a conventional chiller.

Figure 1:
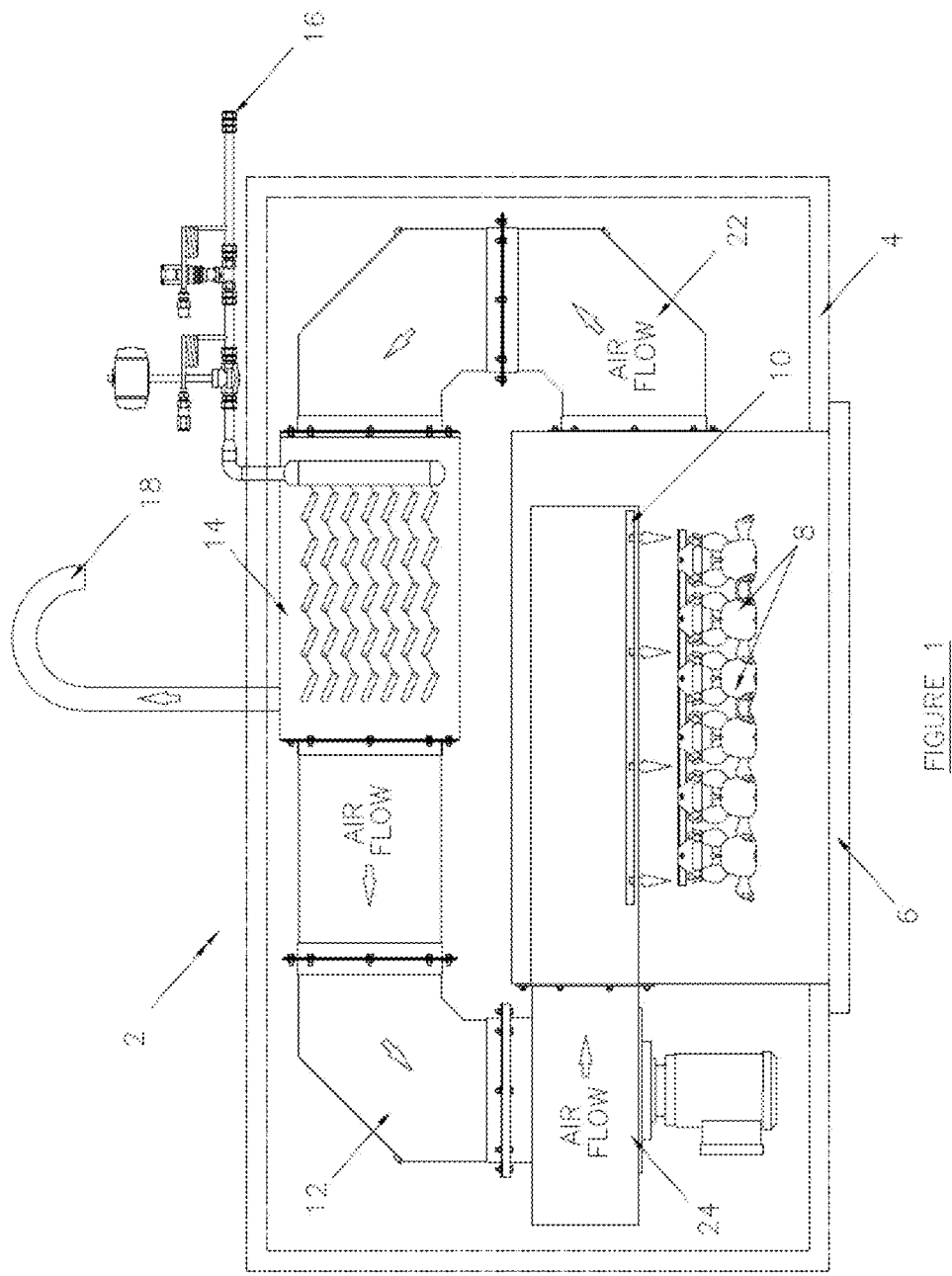
FIG. 1 is a schematic representation of apparatus used to test the process according to the present invention.

In FIG. 1, there is depicted a batch chiller 2 comprising an insulated chill chamber 4 with an entry/exit port 6 for introducing chicken carcasses 8 to be chilled into the chiller 2 and for removing chilled carcasses from the chiller 2. Each carcass 8 is hung upside-down from a shackle (not shown) by the legs in front of a series of nozzles 10 provided in a row in the wall of a first duct 12. The carcasses are orientated such that the breast faces away from the nozzles 10 and downstream in the flow of gaseous air.

A heat exchanger 14 is provided in which air is cooled to a temperature in the range from about −50° C. to about −120° C., e.g. about −100° C., by indirect heat exchange against liquid nitrogen provided from a liquid nitrogen supply 16. The liquid nitrogen is evaporated and vented 18 to a safe location.

The super-chilled air passes through the first duct 12 to the nozzles 10. The flow of air from the nozzles is in the form of a sheet which is directed downwards over the exterior surface of the carcasses and into the body cavity through the entrance at the rear end of the carcasses. After cooling the carcasses, the air is circulated back to the heat exchanger 14 through a second duct 22.

Air is circulated around the chiller 2 using a fan 24.

Figure 2:
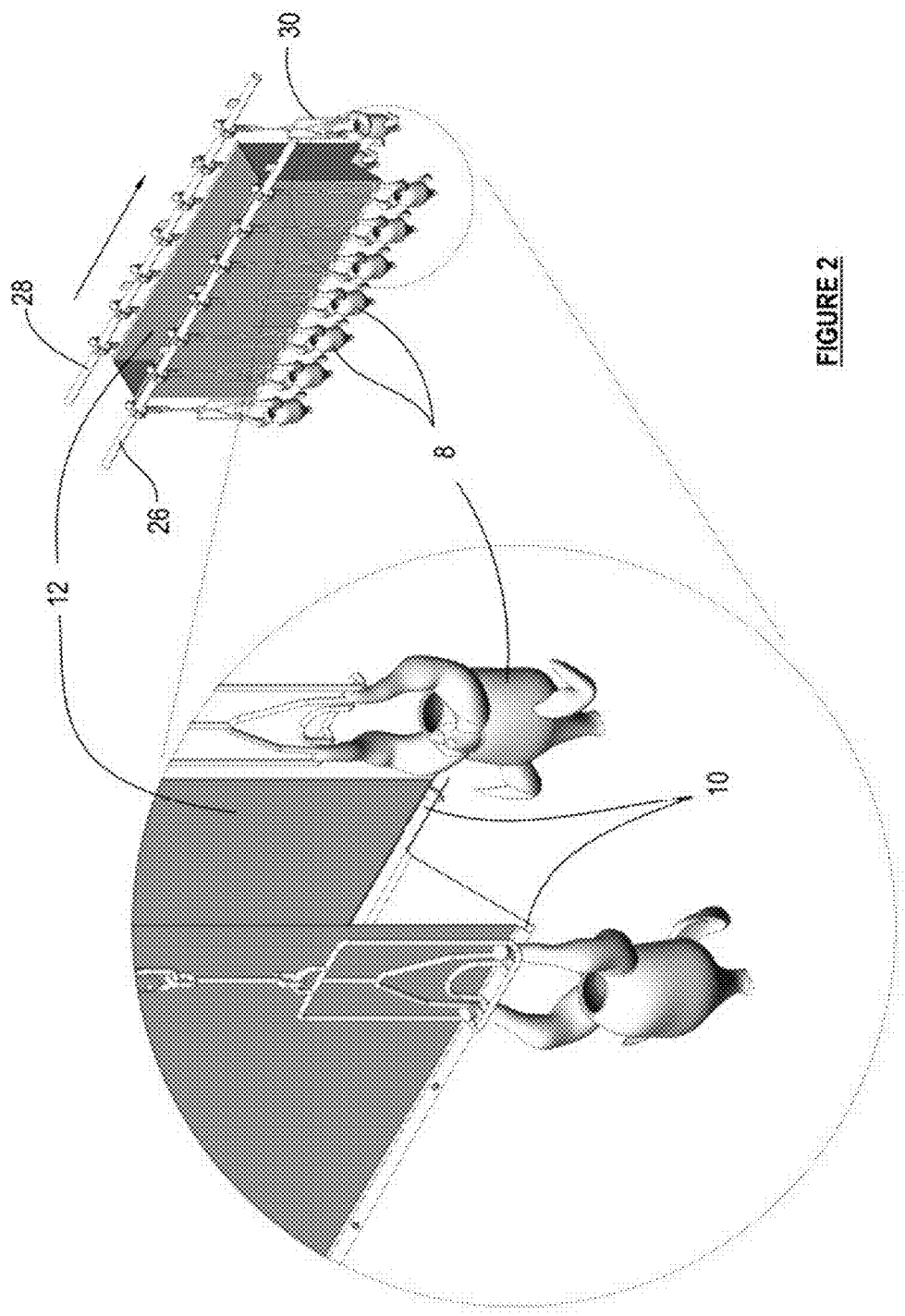
FIG. 2 is a schematic representation in part of one embodiment of apparatus according to the present invention involving at least one continuous shackle line and a duct providing twin flows of super-chilled gaseous air.

In FIG. 2, there are depicted two sections 26, 28 of shackle line(s) suitable for use in a continuous chilling process. The sections 26, 28 could form part of the same single shackle line in which case the sections would be moving in opposite directions (as in FIG. 4), or could each form part of the different lines in a twin shackle line in which case the sections would be moving in the same direction.

The first and second sections 26, 28 of shackle line(s) are provided in parallel with a first duct 12 located therebetween providing twin flows of super-chilled gaseous air. Each section of line has a plurality of shackles 30 by which poultry carcasses 8 are hung upside-down in front of the nozzles 10. The sections 26, 28 of shackle line move the carcasses 8 through the flows of gaseous air.

As depicted in detail in the inset, the carcasses are orientated such that the sternum of each bird faces downstream. The flow of gaseous air is directed over the exterior surface of the carcasses, and into the body cavity through the entrance at the rear end.

The "breast-out" orientation of the birds is depicted in FIG. 3. This figure also depicts the preferred angle of about 45° for the twin flows of super-chilled gaseous air.

FIG. 4 depicts one possible configuration for a shackle line through a rapid chiller (not shown) that has been retro-fitted to a shackle line from a conventional chiller (not shown).

The features in FIGS. 3 and 4 that are common to FIGS. 1 and 2 have been given the same reference numerals.

EXAMPLE 1

A series of trials using a batch chiller according to FIG. 1 have been carried out. Since levels of *Campylobacter* infection in poultry flocks vary from one location to another in the UK, the different trials involved chicken flocks from different locations in the UK. The different flocks had different initial levels of *Campylobacter* infection.

In each trial, the chickens were slaughtered, defeathered and eviscerated, and the head and feet were removed. A flap of skin from the neck was left on each carcass.

The level of *Campylobacter* infection was measured before and after the rapid chill treatment. In this regard, half of the neck flap was removed prior to treatment and tested for *Campylobacter* infection. The remaining half of the neck flap was then removed after treatment and also tested for *Campylobacter* infection.

The carcasses of different sized birds from different geographical locations were hung in the chiller such that the sternum of each bird was facing downstream, and then exposed to a flow (2000 m³/h) of super-chilled air at different temperatures (−60° C., −80° C. or −100° C.) for different periods of time (30 s, 40 s and 50 s). The angle at which the flow of super-chilled air impinged on the carcass was about 45°.

The carcasses were inspected visually after each chill cycle, paying particular attention to the quality, discoloration and texture of the breast meat. In this regard, no discoloration or texture changes were apparent on the meat after the skin was removed for carcasses exposed to the super-chilled air at −100° C. for 30 s, 40 s or 50 s and the meat therefore met the required quality standard.

The level of *Campylobacter* infection both before and after treatment was measured using the colony-count technique described in Part 2 of the Technical Specification entitled "*Microbiology of food and animal feed stuffs—Horizontal method for detection and enumeration of Campylobacter ssp.*" (DD ISO/TS 10272-2:2006). This technique involves inoculating a selective agar medium (modified charcoal cefoperazone deoxycholate or "mCCD" agar) with specified quantities of dilutions of a test sample and incubating the plates at 41.5° C. in a micro-aerobic atmosphere for 40 h to 48 h. The colonies presumed to be *Campylobacter* are subcultured on a non-selective agar medium (Colombia blood agar), then confirmed by means of microscopic examination and appropriate biochemical and growth tests. The number of *Campylobacter* per gram of the test sample is calculated from the number of confirmed typical colonies per plate.

The results from these trials are provided in the following table:

| Trial No. | Location | $T_{air}$ (° C.) | 30 s | 40 s | 50 s | EV weight (kg) | Infection before (cfu/g) | Infection after (cfu/g) | Log reduction | % kill |
|---|---|---|---|---|---|---|---|---|---|---|
| 1 | Hertfordshire #1 | −100 | ✓ | x | x | 2.46 | 1000 | 50 | 2.3 | 95.0 |
|  |  | −100 | x | ✓ | x | 2.46 | 10000 | 20 | 2.7 | 99.8 |
|  |  | −100 | x | x | ✓ | 2.46 | 2400 | 20 | 2.1 | 99.2 |
| 2 | Essex | −100 | ✓ | x | x | 1.78 | 20000 | 200 | 2.0 | 99.0 |
|  |  | −100 | x | ✓ | x | 1.79 | 2300 | 40 | 1.8 | 98.3 |
|  |  | −100 | x | x | ✓ | 1.80 | 510 | 30 | 1.2 | 94.1 |
|  |  | −100 | ✓ | x | x | 1.84 | 5222 | 64 | 1.6 | 98.8 |
|  |  | −100 | x | ✓ | x | 1.84 | 33264 | 437 | 2.2 | 98.7 |
|  |  | −100 | x | x | ✓ | 1.84 | 4804 | 22 | 2.7 | 99.6 |
| 3 | Perthshire | −100 | ✓ | x | x | 1.30 | 3000 | 33 | 2.0 | 98.7 |
|  |  | −100 | x | ✓ | x | 1.31 | 160000 | 2100 | 1.9 | 99.7 |
|  |  | −100 | x | x | ✓ | 1.32 | 12000 | 38 | 2.5 | 97.5 |
| 4 | Hertfordshire #2 | −100 | ✓ | x | x | 1.85 | 270000 | 40 | 3.8 | 100.0 |
|  |  | −100 | x | ✓ | x | 1.85 | 23000 | 49 | 2.7 | 99.8 |
|  |  | −100 | x | x | ✓ | 1.85 | 20000 | 60 | 2.5 | 99.7 |
|  |  | −100 | ✓ | x | x | 1.91 | 23000 | 50 | 2.7 | 99.8 |
|  |  | −100 | x | ✓ | x | 1.91 | 13000 | 150 | 1.9 | 98.8 |
|  |  | −100 | x | x | ✓ | 1.91 | 14000 | 100 | 2.1 | 99.3 |
| 5 | Cambridgeshire #1 | −100 | ✓ | x | x | 1.86 | 145000 | 50 | 3.5 | 100.0 |
|  |  | −100 | x | ✓ | x | 1.86 | 13000000 | 7000 | 3.3 | 99.9 |
|  |  | −100 | x | x | ✓ | 1.86 | 830000 | 57 | 4.2 | 100.0 |
| 6 | Cambridgeshire #2 | −100 | ✓ | x | x | 1.85 | 710000 | 530 | 3.1 | 99.9 |
|  |  | −100 | x | ✓ | x | 1.85 | 690000 | 90 | 3.9 | 100.0 |
|  |  | −100 | x | x | ✓ | 1.85 | 2800 | 10 | 2.4 | 99.6 |
| 7 | Suffolk #1 | −80 | ✓ | x | x | 1.69 | 50000 | 6000 | 0.9 | 88.0 |
|  |  | −80 | x | ✓ | x | 1.69 | 28000 | 560 | 1.7 | 98.0 |
|  |  | −80 | x | x | ✓ | 1.69 | 11000 | 640 | 1.2 | 94.2 |
| 8 | Suffolk #2 | −60 | ✓ | x | x | 1.66 | 470 | 10 | 1.7 | 97.9 |
|  |  | −60 | x | ✓ | x | 1.66 | 800 | 10 | 1.9 | 98.8 |
|  |  | −60 | x | x | ✓ | 1.66 | 800 | 10 | 1.9 | 98.8 |

EXAMPLE 2

During the test program of Example 1, several chilling cycles were completed in which the six poultry carcasses were hung in the shackles the other way round, i.e. breast inwards, and then exposed to the flow of super-chilled air at −100° C. for 30 s, 40 s or 50 s.

After the chill cycle, the carcasses were inspected visually. Discoloration and texture changes were visually apparent on the breast meat of almost all of the birds after the skin was removed.

While the invention has been described with reference to the preferred embodiments depicted in the figures, it will be appreciated that various modifications are possible within the spirit or scope of the invention.

In this specification, unless expressly otherwise indicated, the word 'or' is used in the sense of an operator that returns a true value when either or both of the stated conditions are met, as opposed to the operator 'exclusive or' which requires only that one of the conditions is met. The word 'comprising' is used in the sense of 'including' rather than to mean 'consisting of'. All prior teachings above are hereby incorporated herein by reference. No acknowledgment of any prior published document herein should be taken to be an admission or representation that the teaching thereof was common general knowledge in Australia or elsewhere at the date thereof.

The invention claimed is:

1. A process for rapidly chilling poultry carcasses to reduce the number of viable microorganisms present thereon, said process comprising:
   conveying poultry carcasses through an insulated chill chamber for a period of time in the range from about 1 s to about 60 s;
   circulating gaseous air that has been warmed by the carcasses from the chill chamber through a first duct to a heat exchanger;
   cooling the air in the heat exchanger by indirect heat exchange with a liquid cryogen to create chilled air at a temperature in the range from about −50° C. to about −120° C.;
   circulating the chilled air from the heat exchange through a second duct back to the chill chamber; and
   flowing the chilled air over said carcasses and into the body cavity of said carcasses, wherein said carcasses are orientated such that the sternum of each carcass faces downstream with respect to the flow of the chilled air.

2. A process according to claim 1, wherein said poultry carcasses are conveyed on a continuous shackle line that passes through said flow of said gaseous air.

3. A process according to claim 1, wherein a first plurality of said poultry carcasses is conveyed on a first continuous shackle line through a first flow of said gaseous air, and a second plurality of said poultry carcasses is conveyed simultaneously and in parallel on a second continuous shackle line through a second flow of said gaseous air, said first and second flows of gaseous air being provided from a common duct located between said parallel shackle lines.

4. A process according to claim 1, wherein said flow of gaseous air is in the form of a planar sheet.

5. A process according to claim 1, wherein said temperature is lower than −75° C.

6. A process according to claim 1, wherein said temperature is no lower than about −110° C.

7. A process according to claim 1, wherein said temperature is about −100° C.

8. A process according to claim 1, wherein said period of time is at least 15 s.

9. A process according to claim 1, wherein said period of time is no more than about 55 s.

10. A process according to claim 1, wherein said period of time is in the range from about 30 s to about 45 s.

11. A process according to claim 1, wherein said carcasses are pre-chilled to an initial temperature in the range from about +7° C. to about −1° C. prior to exposure to said flow of gaseous air.

12. A process according to claim 1, wherein after said exposure to said gaseous air, said carcasses are allowed to recover by natural warming.

13. A process according to claim 1, wherein after said exposure to said gaseous air, said carcasses are allowed to equilibrate for a period of time of at least 5 mins before further processing.

14. A process according to claim 13, wherein said equilibration time is no more than 30 mins.

15. A process according to claim 1, wherein said flow of gaseous air has a flow rate from about 1500 m³/h to about 2500 m³/h.

16. Apparatus for rapidly chilling poultry carcasses to reduce the number of viable microorganisms thereon, said apparatus comprising:

an insulated chill chamber having an entry port and an exit port;

a continuous shackle line located within said chill chamber for conveying poultry carcasses from said entry port to said exit port;

a heat exchanger for cooling air by indirect heat exchange against a liquid cryogen;

at least one nozzle located parallel to said continuous shackle line for feeding a flow of cooled air into said chill chamber in the form of a planar sheet, said nozzle being arranged to direct said flow over said carcasses and into the body cavity of said carcasses on said shackle line;

a first duct for feeding cooled air from said heat exchanger to said nozzle(s);

a second duct for feeding warmed air from said chill chamber to said heat exchanger; and a fan for circulating air from the chill chamber through the second duct, across the heat exchanger, and through the first duct to the chill chamber.

17. Apparatus according to claim 16, comprising two continuous shackle lines in parallel and at least one nozzle having a rectangular aperture for each shackle line, said first duct being common to said at least one nozzle.

* * * * *